(12) United States Patent
Wang et al.

(10) Patent No.: US 10,790,954 B2
(45) Date of Patent: Sep. 29, 2020

(54) IMPLICIT ACKNOWLEDGMENT (ACK) MAPPING

(71) Applicant: QUALCOMM Incorporated, San Diego, CA (US)

(72) Inventors: Renqiu Wang, San Diego, CA (US); Yi Huang, San Diego, CA (US); Wanshi Chen, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/169,417

(22) Filed: Oct. 24, 2018

(65) Prior Publication Data
US 2019/0123879 A1  Apr. 25, 2019

Related U.S. Application Data

(60) Provisional application No. 62/577,127, filed on Oct. 25, 2017.

(51) Int. Cl.
*H04W 72/12* (2009.01)
*H04L 5/00* (2006.01)
(Continued)

(52) U.S. Cl.
CPC .......... *H04L 5/0055* (2013.01); *H04L 1/1614* (2013.01); *H04L 1/1854* (2013.01);
(Continued)

(58) Field of Classification Search
CPC ... H04L 5/0055; H04L 5/0064; H04L 1/1614; H04L 1/1685; H04L 1/1864;
(Continued)

(56) References Cited

U.S. PATENT DOCUMENTS

2016/0007324 A1*  1/2016  Lee .................... H04L 5/0055
                                                      370/329
2016/0270066 A1    9/2016  Seo et al.
(Continued)

FOREIGN PATENT DOCUMENTS

EP      3358897 A1    8/2018
WO    2017078147 A1   5/2017

OTHER PUBLICATIONS

International Search Report and Written Opinion—PCT/US2018/057513—ISA/EPO—dated Jan. 28, 2019.
(Continued)

*Primary Examiner* — Edan Orgad
*Assistant Examiner* — Malick A Sohrab
(74) *Attorney, Agent, or Firm* — Patterson & Sheridan, LLP

(57) ABSTRACT

Certain aspects of the present disclosure provide techniques for determining and utilizing resources for communicating an acknowledgment message (ACK). In certain aspects, a method generally includes determining a number of bits to utilize for communicating an acknowledgement (ACK) for a data transmission on a physical downlink shared channel (PDSCH). The method further includes determining a resource on a physical uplink control channel (PUCCH) to utilize for communicating the ACK based on the number of bits. The method further includes communicating the ACK on the resource.

22 Claims, 12 Drawing Sheets

1300

1302

DETERMINING A RESOURCE ON A PHYSICAL UPLINK CONTROL CHANNEL (PUCCH) TO UTILIZE FOR COMMUNICATING AN ACKNOWLEDGEMENT (ACK) FOR A DATA TRANSMISSION ON A PHYSICAL DOWNLINK SHARED CHANNEL (PDSCH) BASED ON A CONTROL CHANNEL ELEMENT (CCE) INDEX OF A FIRST CCE IN A PHYSICAL DOWNLINK CONTROL CHANNEL (PDCCH) THAT INCLUDES A DOWNLINK GRANT FOR THE DATA TRANSMISSION ON THE PDSCH AND AT LEAST ONE OF: A CORESET INDEX OF A CORESET IN WHICH THE FIRST CCE IS INCLUDED, A SLOT INDEX OF THE PUCCH, A SLOT INDEX OF THE PDSCH, AN OFFSET VALUE BETWEEN COMMUNICATION OF THE ACK AND THE PDSCH, OR A MAPPING OF CCE INDEXES TO EITHER A LONG OR SHORT REGION OF THE PUCCH

(51) Int. Cl.
   *H04W 72/04* (2009.01)
   *H04L 1/16* (2006.01)
   *H04L 1/18* (2006.01)
(52) U.S. Cl.
   CPC .......... *H04L 1/1861* (2013.01); *H04L 1/1864* (2013.01); *H04L 5/0053* (2013.01); *H04L 5/0064* (2013.01); *H04W 72/042* (2013.01); *H04L 1/1685* (2013.01)
(58) Field of Classification Search
   CPC ... H04L 1/1854; H04L 5/0053; H04L 1/1861; H04L 1/00–1896; H04W 72/042
   See application file for complete search history.

(56) References Cited

U.S. PATENT DOCUMENTS

2018/0255566 A1* 9/2018 Takeda .................. H04L 5/0042
2019/0223204 A1* 7/2019 Kim ...................... H04L 1/1887

OTHER PUBLICATIONS

Qualcomm Incorporated: "Resource Allocation and Transmit Diversity for PUCCH", 3GPP Draft, R1-1718566 Resource Allocation for PUCCH, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017 Oct. 8, 2017 (Oct. 8, 2017), XP051341747, pp. 1-14.

* cited by examiner

1300

1302

DETERMINING A RESOURCE ON A PHYSICAL UPLINK CONTROL CHANNEL (PUCCH) TO UTILIZE FOR COMMUNICATING AN ACKNOWLEDGEMENT (ACK) FOR A DATA TRANSMISSION ON A PHYSICAL DOWNLINK SHARED CHANNEL (PDSCH) BASED ON A CONTROL CHANNEL ELEMENT (CCE) INDEX OF A FIRST CCE IN A PHYSICAL DOWNLINK CONTROL CHANNEL (PDCCH) THAT INCLUDES A DOWNLINK GRANT FOR THE DATA TRANSMISSION ON THE PDSCH AND AT LEAST ONE OF: A CORESET INDEX OF A CORESET IN WHICH THE FIRST CCE IS INCLUDED, A SLOT INDEX OF THE PUCCH, A SLOT INDEX OF THE PDSCH, AN OFFSET VALUE BETWEEN COMMUNICATION OF THE ACK AND THE PDSCH, OR A MAPPING OF CCE INDEXES TO EITHER A LONG OR SHORT REGION OF THE PUCCH

FIG. 13

IMPLICIT ACKNOWLEDGMENT (ACK) MAPPING

CROSS-REFERENCE TO RELATED APPLICATIONS

This application claims the benefit of U.S. Provisional Patent No. 62/577,127, filed Oct. 25, 2017. The content of the provisional application is hereby incorporated by reference in its entirety.

INTRODUCTION

Aspects of the present disclosure relate to wireless communications and to techniques for determining and utilizing resources for communicating an acknowledgment message (ACK).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes determining a number of bits to utilize for communicating an acknowledgement (ACK) for a data transmission on a physical downlink shared channel (PDSCH). The method further includes determining a resource on a physical uplink control channel (PUCCH) to utilize for communicating the ACK based on the number of bits. The method further includes communicating the ACK on the resource.

Certain aspects provide a wireless device comprising a memory and a processor coupled to the memory. The processor is configured to determine a number of bits to utilize for communicating an acknowledgement (ACK) for a data transmission on a physical downlink shared channel (PDSCH). The processor is further configured to determine a resource on a physical uplink control channel (PUCCH) to utilize for communicating the ACK based on the number of bits. The processor is further configured to communicate the ACK on the resource.

Certain aspects provide a wireless device. The wireless device includes means for determining a number of bits to utilize for communicating an acknowledgement (ACK) for a data transmission on a physical downlink shared channel (PDSCH). The wireless device further includes means for determining a resource on a physical uplink control channel (PUCCH) to utilize for communicating the ACK based on the number of bits. The wireless device further includes means for communicating the ACK on the resource.

Certain aspects provide a non-transitory computer readable storage medium that stores instructions that when executed by a wireless device cause the wireless device to perform a method for wireless communication. The method generally includes determining a number of bits to utilize for communicating an acknowledgement (ACK) for a data transmission on a physical downlink shared channel (PDSCH). The method further includes determining a resource on a physical uplink control channel (PUCCH) to utilize for communicating the ACK based on the number of bits. The method further includes communicating the ACK on the resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 13 illustrates example operations that may be performed by a wireless device such as a node for mapping PDCCH resources to PUCCH resources for transmission of ACK, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
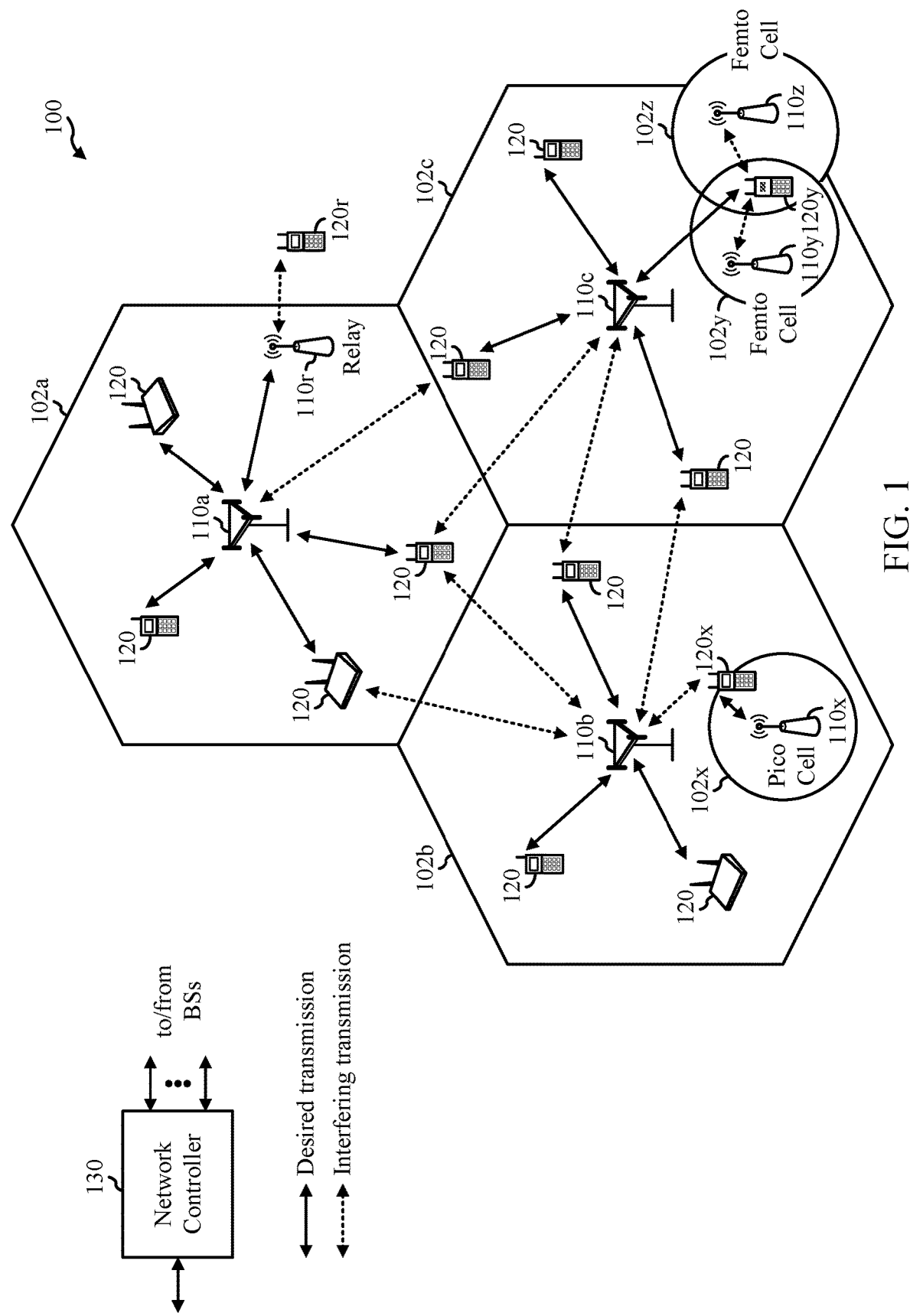
FIG. 1 is a block diagram conceptually illustrating an example telecommunications system, in accordance with certain aspects of the present disclosure.

New radio (NR) or 5G technology may support various wireless communication services, such as Enhanced mobile broadband (eMBB) targeting wide bandwidth (e.g. 80 MHz or beyond), millimeter wave (mmW) targeting high carrier frequency (e.g. 60 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe. In LTE, the basic transmission time interval (TTI) or packet duration is 1 subframe. In NR, a subframe may still be 1 ms, but the basic TTI may be referred to as a slot. A subframe may contain a variable number of slots (e.g., 1, 2, 4, 8, 16, . . . slots) depending on the tone-spacing (e.g., 15, 30, 60, 120, 240 . . . kHz).

Aspects of the present disclosure relate to determining UL resources to use for transmitting acknowledgement messages (ACKs) implicitly based on DL resources used for communicating a DL grant.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network may be a new radio (NR) or 5G network. NR wireless communication systems may employ short uplink bursts. As described herein, for example, UE 120 may receive a DL grant for receiving data on a DL channel from BS 110. UE 120 may determine, implicitly, which resources on the UL to use to transmit an ACK to BS 110 for the data received on the DL channel based on the resources over which the DL grant is received, and transmit the ACK. BS 110 may also determine, implicitly, which resources include the ACK on the UL, and receive the ACK from UE 120.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals (SS), but in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
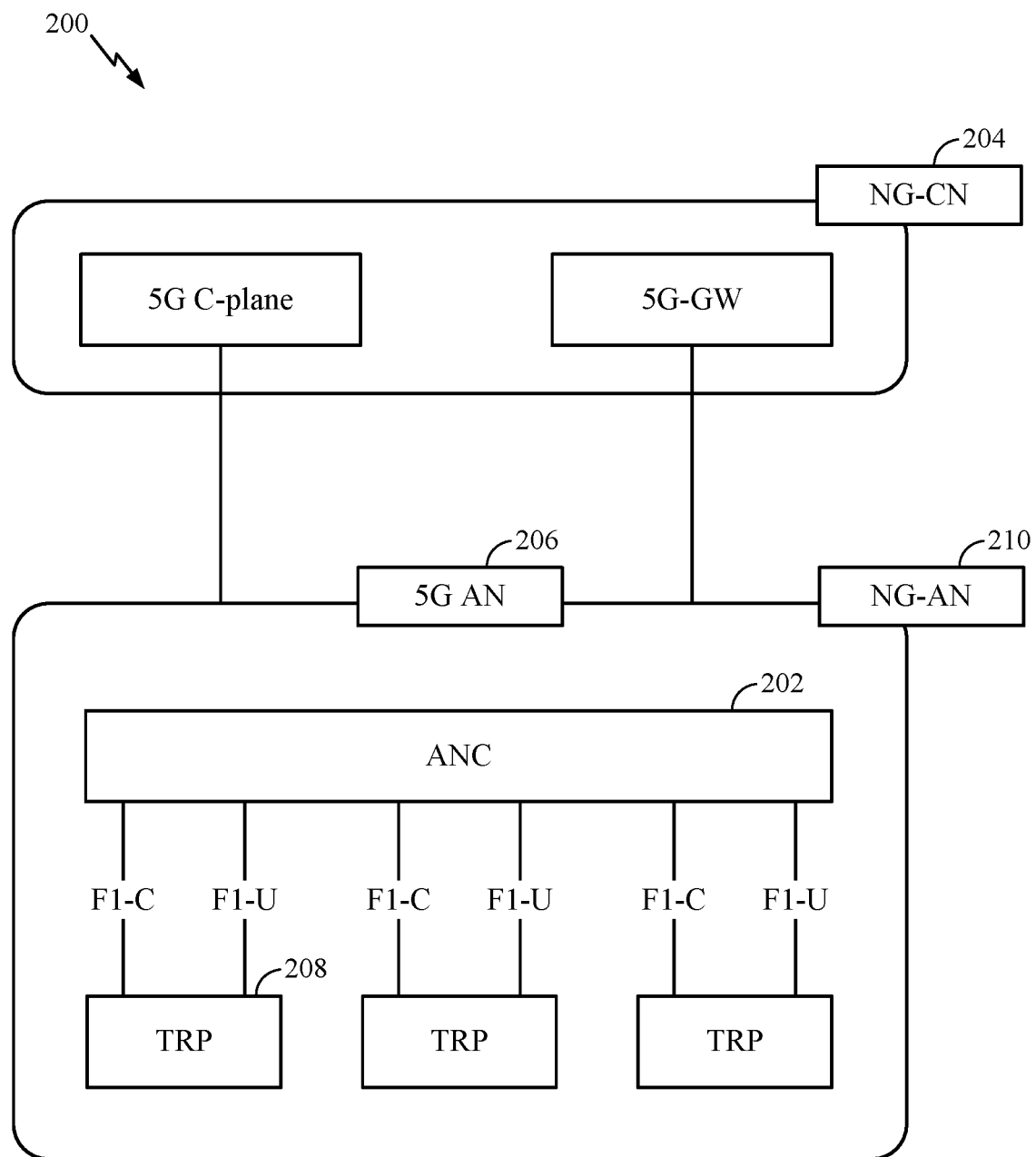
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The next generation AN (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
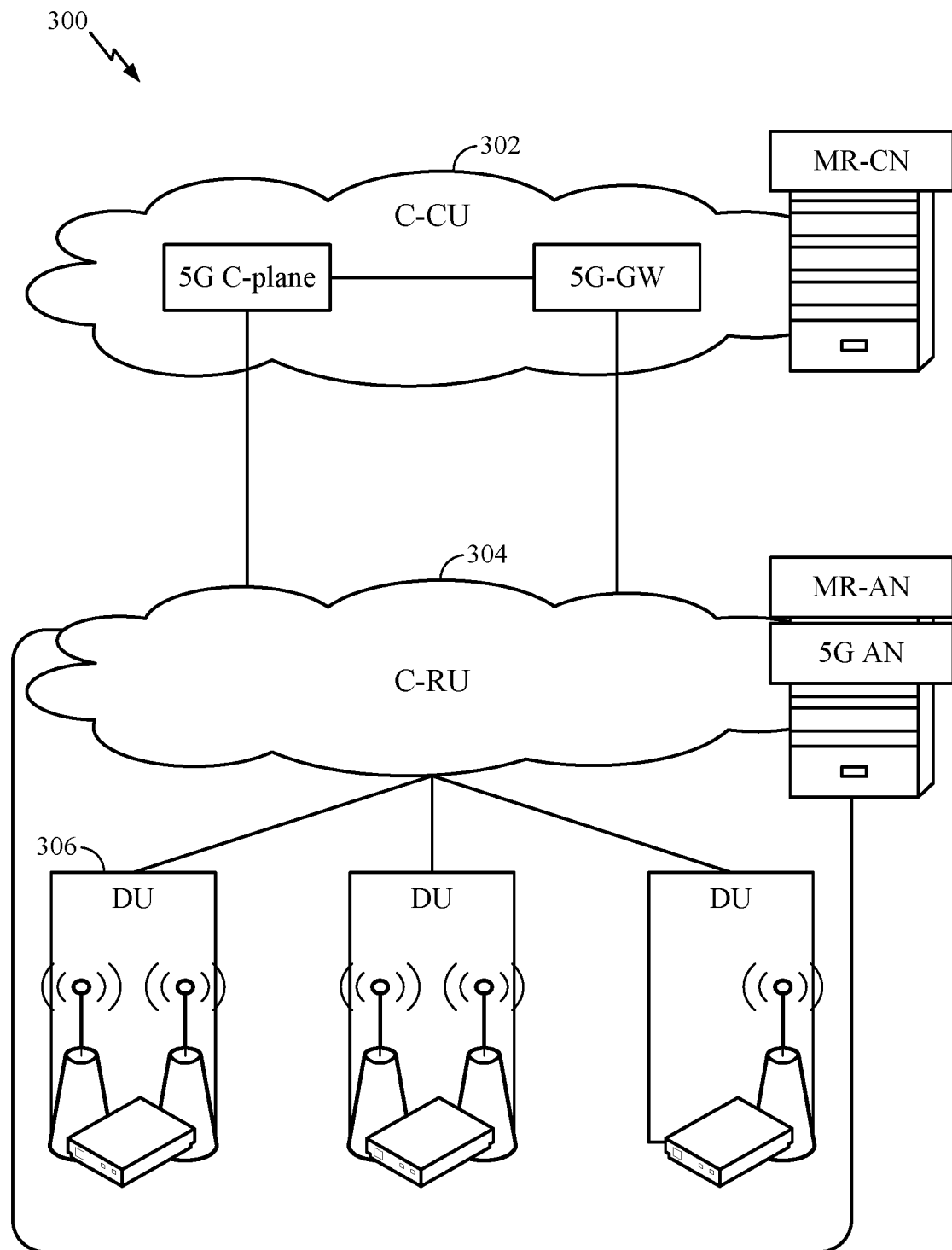
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
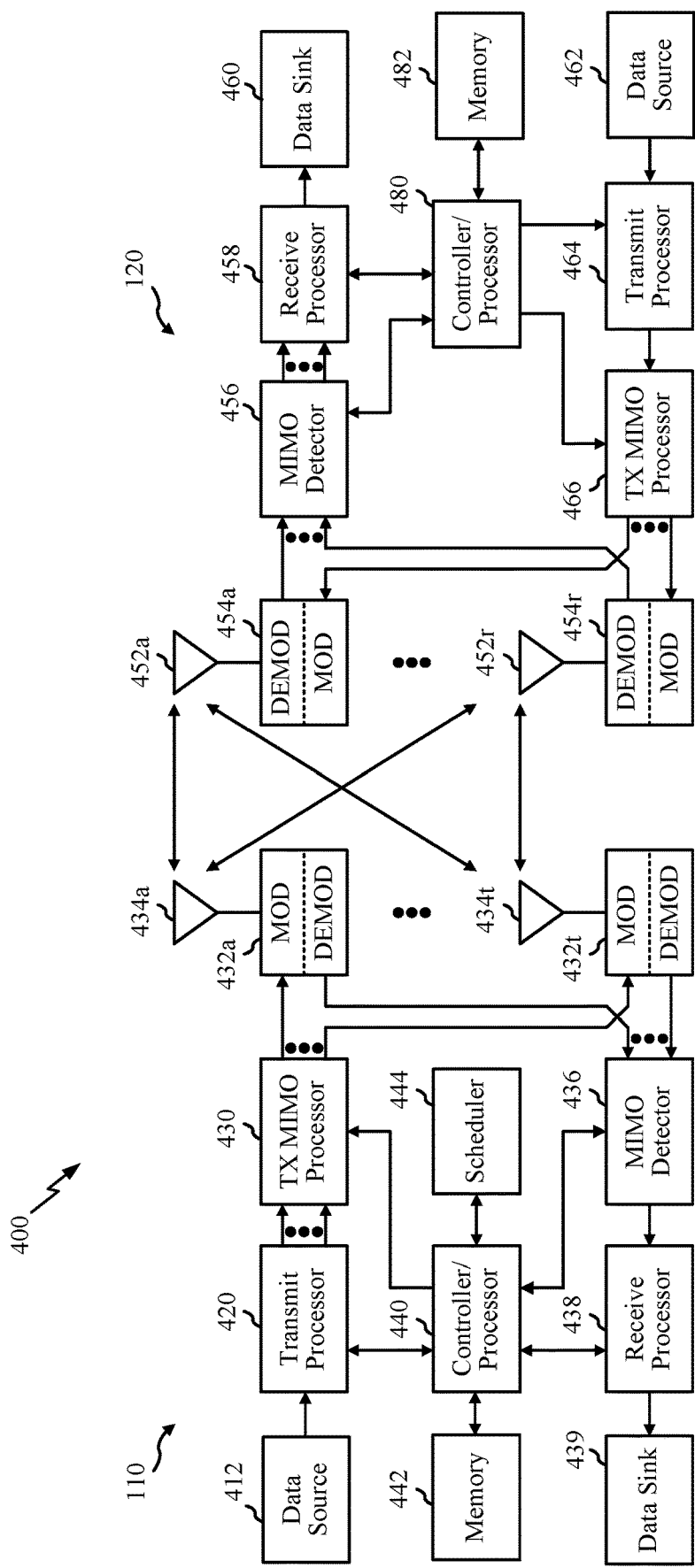
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations 1300 described herein and illustrated with reference to FIG. 13 and complementary operations.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of the functional blocks illustrated in FIG. 13, and/or other complementary processes for the techniques described herein. The memories 442 and 482 may store data and program codes for the BS 110 and the UE 120, respectively. A scheduler 444 may schedule UEs for data transmission on the downlink and/or uplink.

Figure 5:
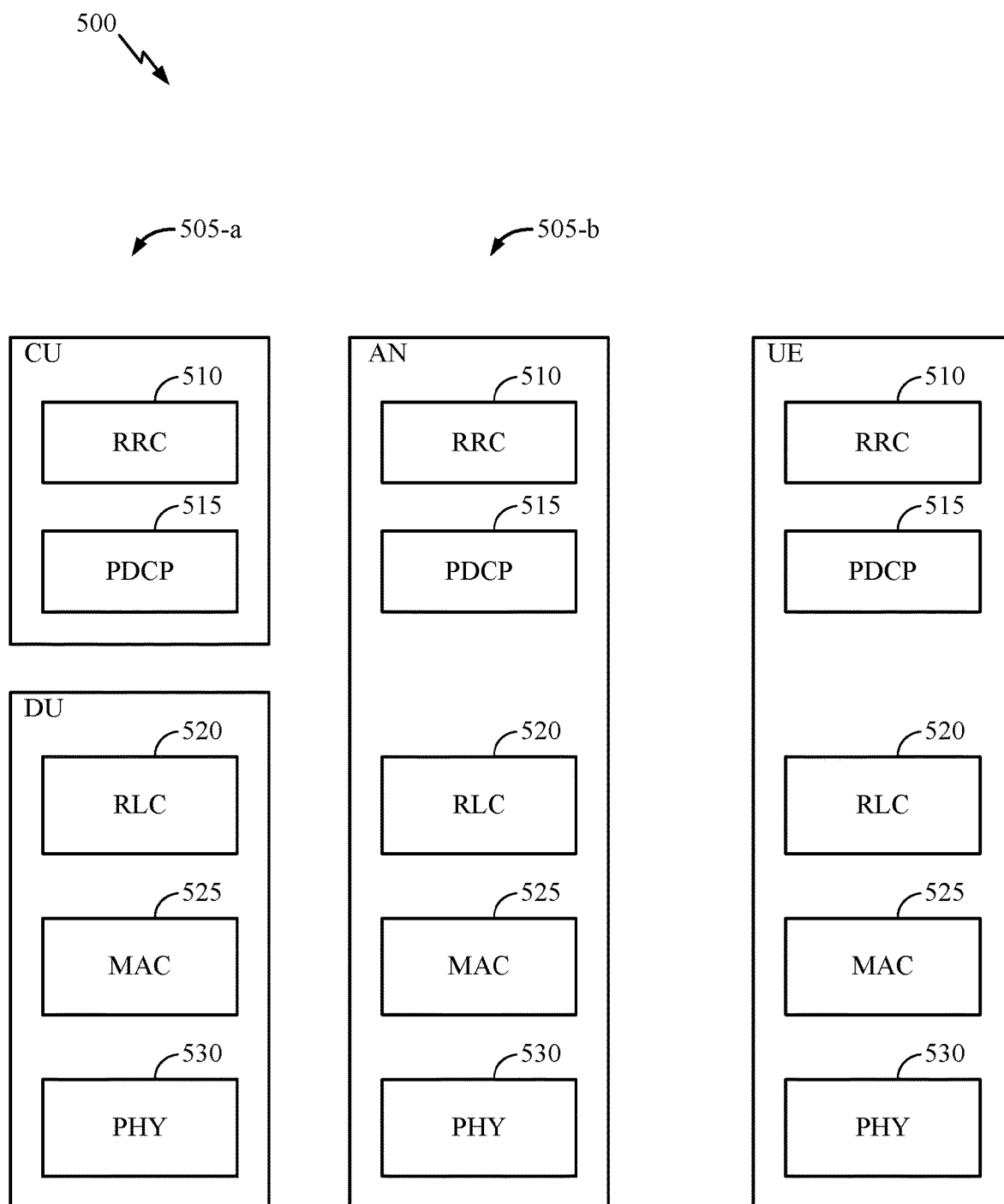
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
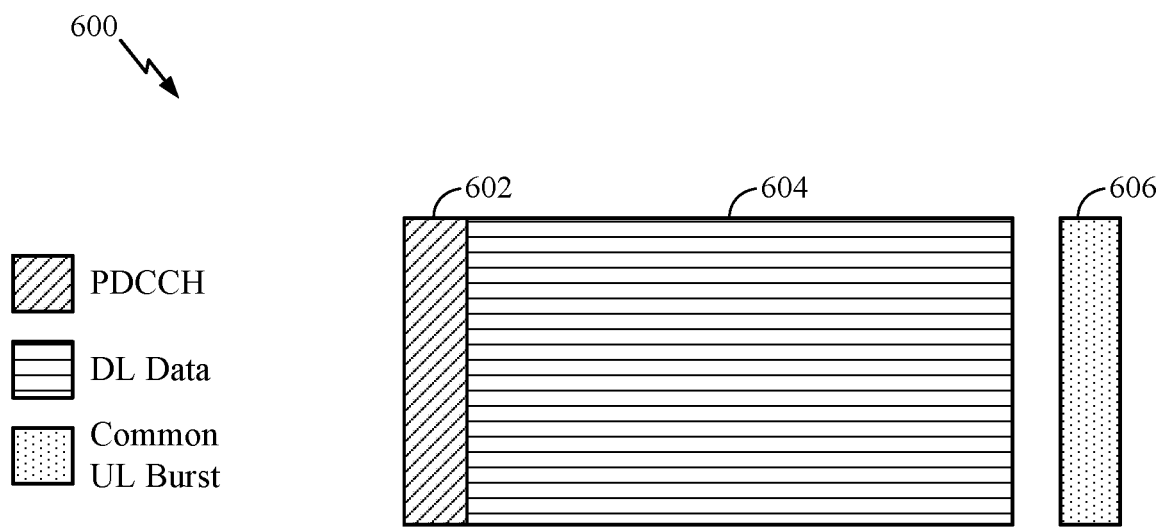
FIG. 6 illustrates an example of a DL-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
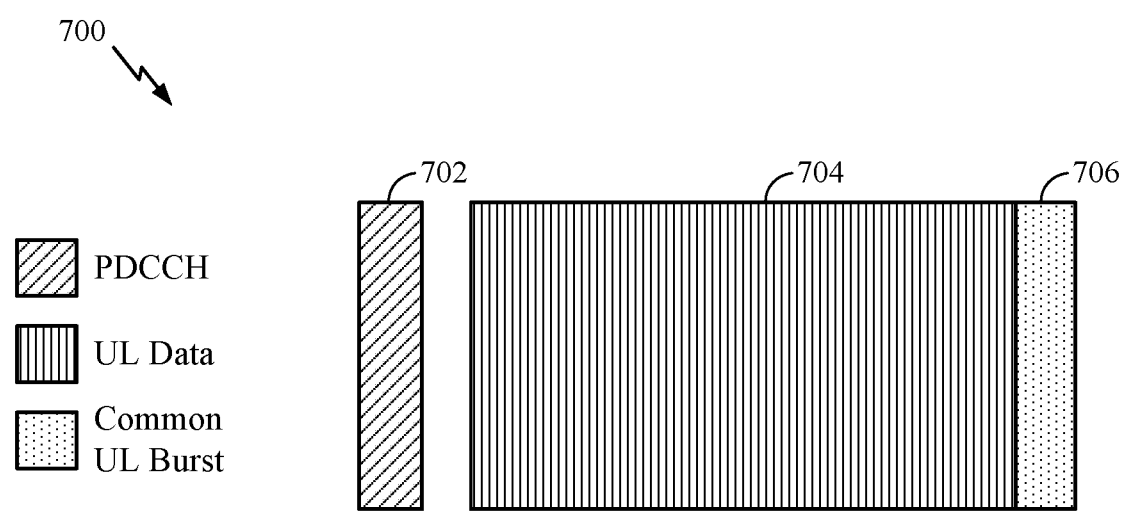
FIG. 7 illustrates an example of an UL-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Acknowledgement Message Mapping

In certain aspects, a first device (e.g., UE 120) may be configured to acknowledge receipt of data received from a second device (e.g., BS 110). For example, UE 120 may receive data from BS 110 on a DL channel (e.g., PDSCH). If the UE 120 is able to successfully decode the received data, UE 120 may send an acknowledgement message (ACK) to the BS 110 on an UL channel (e.g., PUCCH). The BS 110 receiving the ACK from the UE 120 may determine that the UE 120 has successfully received the data and determine that it does not need to retransmit the data to the UE 120 (e.g., as part of a hybrid automatic repeat request (HARQ) procedure). If the BS 110 does not receive the ACK from the UE 120, or receives a negative ACK (NACK) it may retransmit the data to the UE 120.

In certain aspects, the BS 110 may explicitly signal to the UE 120 the resources (e.g., time resources, frequency resources, etc.) of the PUCCH to use for transmitting an ACK for particular data (e.g., a transmission such as transport block (TB), etc.) sent by the BS 110 to the UE 120 on the PDSCH. The BS 110 may include the explicit signaling in the PDCCH. Accordingly, if the BS 110 transmits data transmissions to multiple UEs 120 and/or transmits multiple different data transmissions to a UE 120, the ACKs for the different transmissions may be scheduled on different resources of the PUCCH. Therefore, the BS 110 can determine which ACK corresponds to which data transmission based on the resource the ACK is received on the PUCCH, and determine whether or not to retransmit that particular data transmission.

However, explicitly signaling in the PDCCH the resources on the PUCCH to use for transmitting each ACK may utilize network bandwidth for the signaling, and therefore increase network overhead in the network, thereby reducing overall data throughput. For example, the ACK may only be 1 or 2 bits, and therefore adding additional explicit signaling to grant resources to transmit 1 or 2 bits may create a lot of overhead. Accordingly, certain aspects herein relate to implicitly mapping the resources on which a DL grant for the PDSCH is received in the PDCCH to UL resources on the PUCCH to utilize for communicating the ACK for the data on the PUCCH. Both a UE and BS may perform the implicit mapping, the UE to determine which PUCCH resources to use to transmit the ACK and actually transmit the ACK, and the BS to receive the ACK and determine which data transmission the ACK is for based on the PUCCH resources on which it is received.

In certain aspects, BS 110 may transmit DL grants to one or more UEs 120 in the PDCCH. Each DL grant indicates to a UE 120 resources on a PDSCH allocated to the UE 120 for the BS 110 to send data to the UE 120. Based on the DL grant received in the PDCCH, the UE 120 receives data on the granted resources indicated in the DL grant on the PDSCH. The UE 120 then transmits an ACK to the BS 110 on the PUCCH for the data received on the PDSCH from the BS 110. The techniques herein, in certain aspects, allow the UE 120 (and BS 110) to determine which resources of the PUCCH to utilize to communicate the ACK.

In certain aspects, the PDCCH carries control information, and in particular, carries UE-specific scheduling assignments for DL resource allocation, UL grants, PRACH responses, UL power control commands, and/or common scheduling assignments for signaling messages (e.g., system information, paging, etc.). The PDCCH may span a number of subcarriers in the frequency domain and a number of OFDM symbols in the time domain. The minimum resource element of a PDCCH may be referred to as a resource element (RE) and correspond to one OFDM symbol and one subcarrier. REs may be grouped into resource element groups (REGs). Each REG may include a number of (e.g., 4 consecutive) REs within the same OFDM symbol and the same resource block (RB). REGs may be grouped into control channel elements (CCEs). Each CCE may include a number of (e.g., 9 contiguous) REGs. The CCEs in the PDCCH may be indexed and each CCE referenced by index number corresponding to the position of the CCE in the PDCCH.

In certain aspects, an ACK resource index is derived based on the CCE index (e.g., starting/lowest CCE index) of the CCE (e.g., starting/lowest CCE) in which a DL grant is communicated in the PDCCH. In certain aspects, an ACK resource index is derived based on the ending/highest CCE index of the CCE (e.g., ending/highest CCE) in which a DL grant is communicated in the PDCCH. For example, the BS 110 may communicate a DL grant for resources in the PDSCH in a CCE in the PDCCH to a UE 120. The UE 120 may receive the DL grant on the PDCCH and determine based on the DL grant the resources in the PDSCH to receive data from the BS 110. The UE 120 may receive the data in the PDSCH from the BS 110 on the resources indicated in the DL grant. The UE 120 may further determine the resources to utilize to transmit an ACK for the received data in the PDSCH to the BS 110 based on the CCE index of the CCE in which the DL grant was received.

In particular, the UE 120 may be configured to map the CCE index of the DL grant to an ACK resource index. The ACK resource index may further be mapped to an RB index, cyclic shift index, and/or an orthogonal cover code index. The RB index may indicate an RB to utilize in the PUCCH for transmitting the ACK. The cyclic shift index may indicate a cyclic shift to apply to the ACK. The orthogonal cover code index may indicate an orthogonal cover code to apply to the ACK. The RB used, cyclic shift used, and orthogonal cover code used may correspond to a PUCCH resource as discussed herein. For example, each unique combination of RB, cyclic shift, and orthogonal cover code may correspond to a different PUCCH resource that is distinct from other PUCCH resources. It should be noted that in certain aspects a PUCCH resource may be defined by other parameters that make it distinct from other PUCCH resources. For example, the UE 120 may then utilize the PUCCH resource determined by the CCE index and some explicit signaling (e.g., utilizing the ACK resource index (ARD) to transmit the ACK in the PUCCH to the BS 110 for the received data in the PDSCH.

Figure 8:
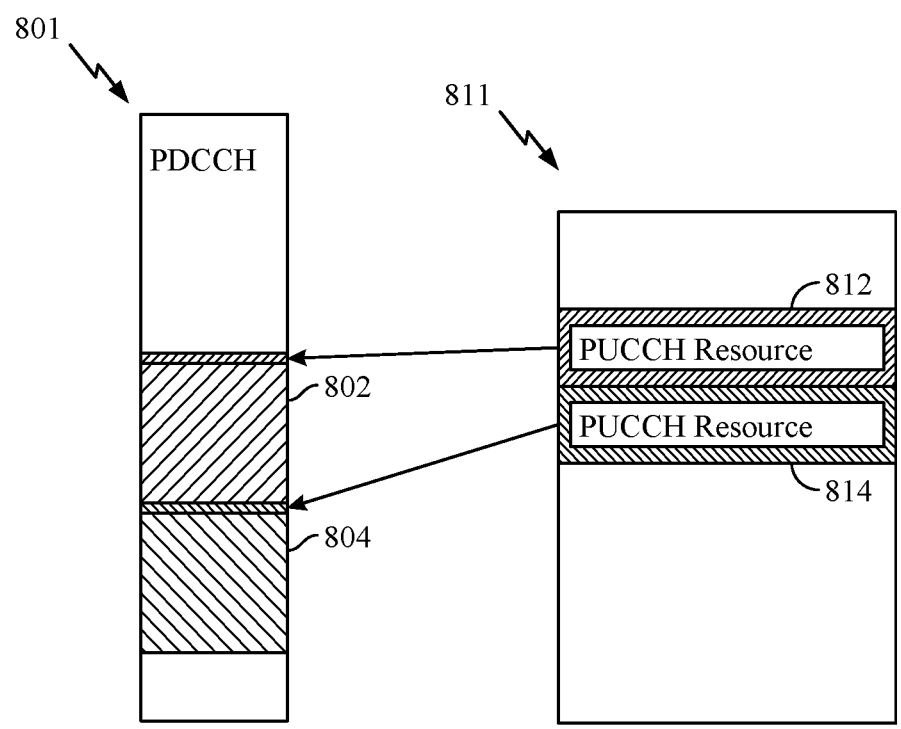
FIGS. 8-12 illustrate different example mappings of PDCCH resources to PUCCH resources, in accordance with certain aspects of the present disclosure.

FIG. 8 illustrates an example mapping of PDCCH 801 resources to PUCCH 811 resources. As shown in FIG. 8, PDCCH 801 includes a first DL grant 802 transmitted in one or more CCEs having a first starting CCE index. PDCCH 801 further includes a second DL grant 804 transmitted in one or more CCEs having a second starting CCE index. The first starting CCE index corresponding to the first DL grant 802 maps to a first PUCCH resource 812 on PUCCH 811. The second starting CCE index corresponding to the second DL grant 804 maps to a second PUCCH resource 814 on PUCCH 811.

In certain aspects, where carrier aggregation (CA) is used, BS 110 may transmit different PDCCH on multiple carriers (e.g., different frequency bandwidths). Each of the different PDCCHs may include DL grants for different carriers. However, the CCE indexes in which DL grants are transmitted on different carriers may be the same. For example, BS 110 may transmit a first DL grant on a first carrier starting at CCE index 1. The BS 110 may further transmit a second DL grant on a second carrier also starting at CCE index 1. Further, the number of carriers used for the DL and UL may not be the same. For example, the DL may use 2 carriers, and the UL only 1 carrier. Accordingly, the UE for which the first DL grant is directed may, based on the CCE index of the first DL grant, map the ACK to the same PUCCH resource on the 1 UL carrier as the UE for which the second DL grant is directed due to the CCE index being the same. In order to resolve such conflicts/collisions, explicit signaling (e.g., an ARI in the downlink control information (DCI)) may be included in the PDCCH. The explicit signaling may indicate a different resource or offset for one of the UEs to utilize (e.g., associated with the first DL grant or the second DL grant).

In certain aspects, such as in NR systems, the PDCCH may be divided into multiple CORESETs. In particular, each UE 120 may only monitor (e.g., receive) a subset of the entire PDCCH region referred to as a CORESET of the UE 120. The CCE index, however, may be relative within a CORESET. Therefore, a DL grant for a first UE in a first CORESET may have the same CCE index as a DL grant for a second UE in a second CORESET, and therefore both the first UE and second UE may map the CCE index to the same PUCCH resource for ACK transmission leading to a collision.

Figure 9A:
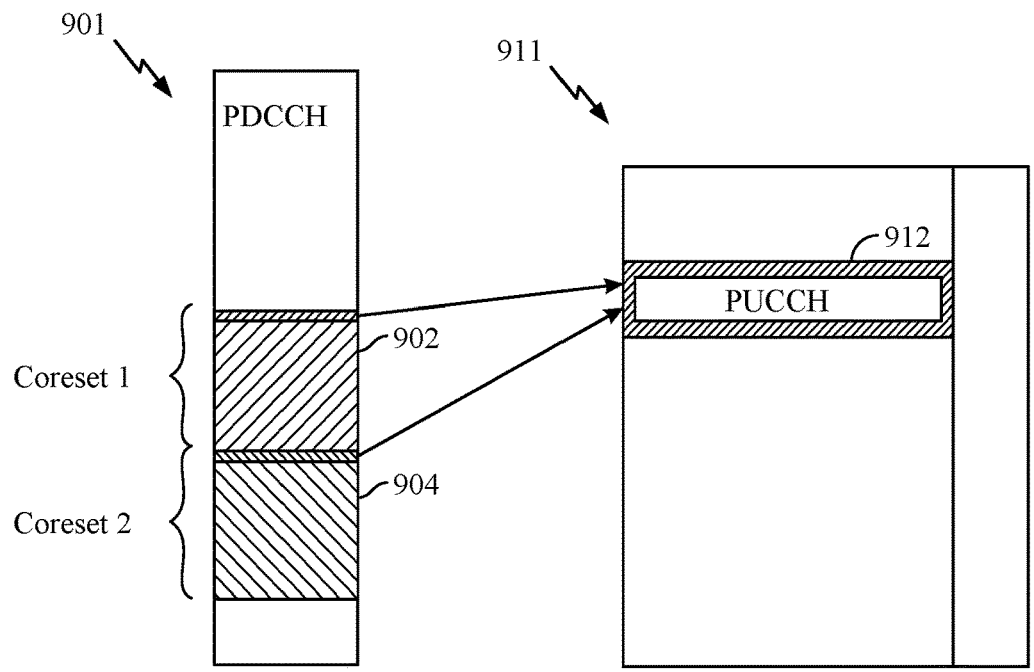

FIG. 9A illustrates an example mapping of PDCCH 901 resources to PUCCH 911 resources. As shown, PDCCH 901 includes a first DL grant 902 transmitted in a first CORESET in one or more CCEs having a first starting CCE index. PDCCH 901 further includes a second DL grant 904 transmitted in a second CORESET in one or more CCEs having the first starting CCE index. Since the first DL grant 902 and the second DL grant 904 have the same starting CCE index within the CORESET, they map to the same PUCCH resource 912 on PUCCH 911, leading to a collision.

Figure 9B:
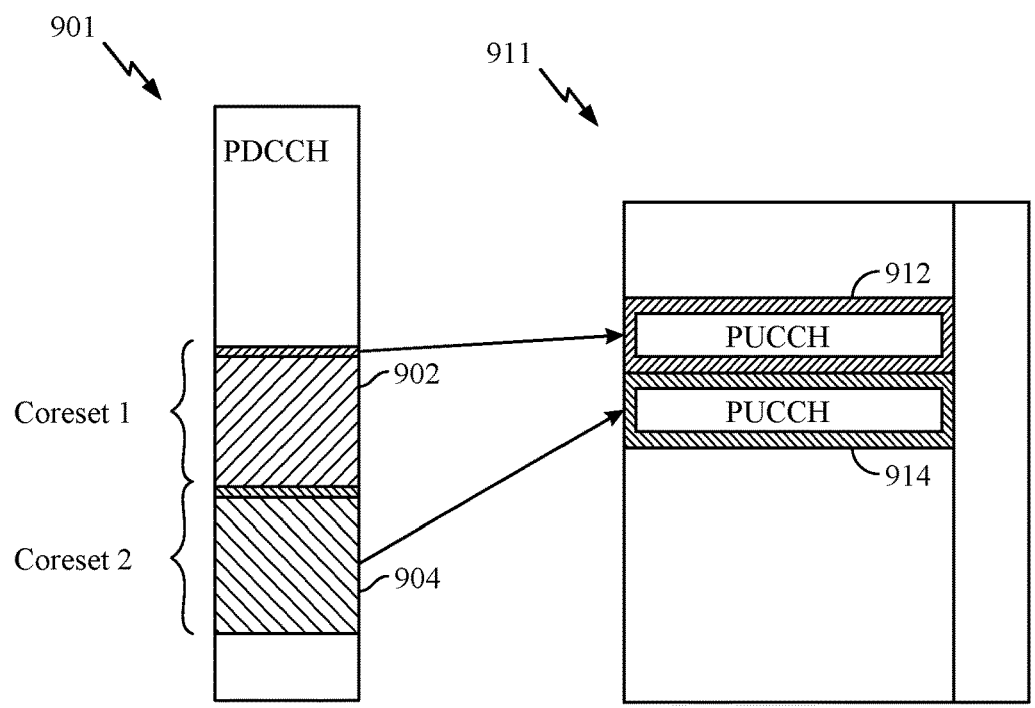

Accordingly, in certain aspects, the UE 120 (and BS 110) may be configured to derive a PUCCH resource (e.g., an ARI) for ACK transmission based on both a CCE index and CORESET index (e.g., indicating the CORESET) in which the DL grant is included in the PUCCH. For example, the UE 120 (and BS 110) may add a CORESET dependent offset to the PUCCH resource (e.g., one or more of the parameters of the PUCCH resource, to the ARI, etc.) indicated by the CCE index. FIG. 9B illustrates an example such mapping of PDCCH 901 resources to PUCCH 911 resources. As shown, PDCCH 901 includes a first DL grant 902 transmitted in a first CORESET in one or more CCEs having a first starting CCE index. PDCCH 901 further includes a second DL grant 904 transmitted in a second CORESET in one or more CCEs having the first starting CCE index. Since the first DL grant 902 and the second DL grant 904 have the same starting CCE index but a different CORESET index, they map to different PUCCH resources 912 and 914, respectively, on PUCCH 911.

In certain aspects, the number of PUCCH resources to be reserved when mapping based on CCE index and CORESET index depends on the total DL PDCCH bandwidth, meaning that utilizing CORESET dependent mapping does not require more PUCCH resources be reserved than UEs 120 receiving the PDSCH DL grant on the PDCCH. In certain aspects, a global CCE index across multiple CORESETs may be used so the mapping function based on CCE index works with multiple CORESETs.

In certain aspects, PDCCH may be transmitted in multiple slots (in the time domain) using cross slot scheduling. A UE 120 may determine which slot includes the PDSCH for which a DL grant is received in the PDCCH based on a time offset value (e.g., K0 value, which may be configured using RRC configuration) from the PDCCH time slot in which the DL grant is received to the PDSCH time slot the DL grant is for. The UE 120 may further determine which time slot to transmit ACK in the PUCCH based on a time offset value (e.g., K1 value, which may be configured using RRC configuration, in the DCI, as part of the DL grant, etc.) from the PDCCH time slot where data is received to the PUCCH time slot to use for the ACK. Therefore, in certain cases, though PDSCH may be transmitted in different slots for different UEs 120 (e.g., due to PDCCH being transmitted in different time slots and/or different K1 values used), they may utilize the same time slot in the PUCCH for transmitting ACK.

Figure 10A:
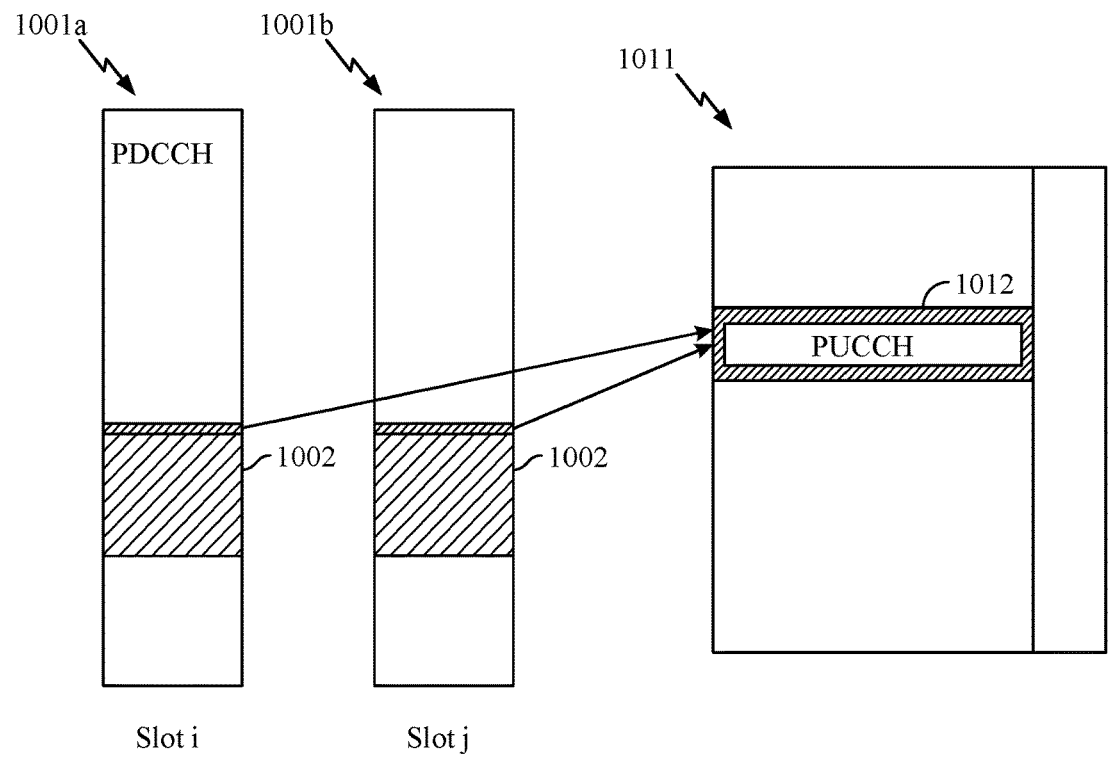

FIG. 10A illustrates an example mapping of PDCCH 1001a and 1001b resources to PUCCH 1011 resources. As shown, PDCCH 1001a corresponds to PDCCH transmitted in a first time slot and includes a first DL grant 1002 transmitted in one or more CCEs having a first starting CCE index. PDCCH 1001b corresponds to PDCCH transmitted in a second time slot and includes a second DL grant 1004 transmitted in one or more CCEs having the first starting CCE index. Since the first DL grant 1002 and the second DL grant 1004 have the same starting CCE index, they map to the same PUCCH resource 1012 on PUCCH 1011, leading to a collision. Further, if BS 110 wants to schedule a single UE 120 to transmit ACK for different slots/K1 values simultaneously, it has to use the same CCE index in the PDCCH, leading to scheduling constraints.

Figure 10B:
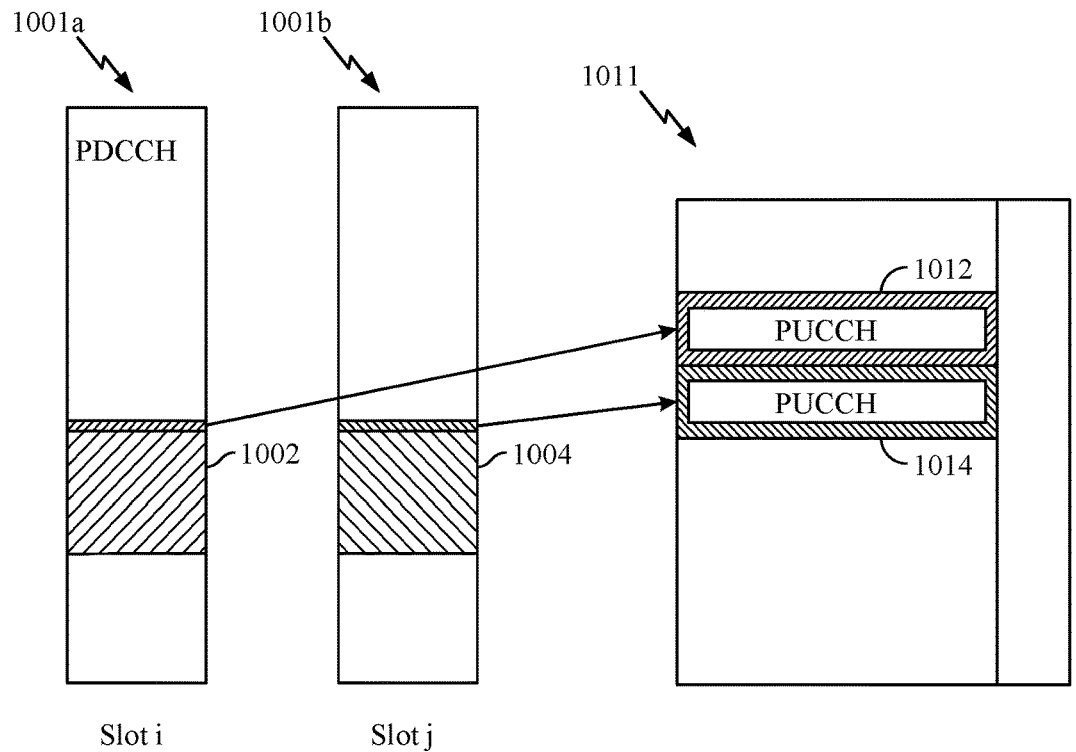

Accordingly, in certain aspects, the UE 120 (and BS 110) may be configured to derive a PUCCH resource (e.g., an ARI) for ACK transmission based on both a CCE index and slot index (e.g., of the PDCCH including the DL grant, or the PDSCH of the DL grant) and/or K1 value (for the DL grant). For example, the UE 120 (and BS 110) may add a slot index/K1 dependent offset to the PUCCH resource (e.g., one or more of the parameters of the PUCCH resource, to the ARI, etc.) indicated by the CCE index. FIG. 10B illustrates an example such mapping of PDCCH 1001a and 1001b resources to PUCCH 1011 resources. As shown, PDCCH 1001a corresponds to PDCCH transmitted in a first time slot and includes a first DL grant 1002 transmitted in one or more CCEs having a first starting CCE index. PDCCH 1001b corresponds to PDCCH transmitted in a second time slot and includes a second DL grant 1004 transmitted in one or more CCEs having the first starting CCE index. Since the first DL grant 1002 and the second DL grant 1004 have the same starting CCE index, but a different slot index and/or K1 value, they map to different PUCCH resources 1012 and 1014, respectively, on PUCCH 1011.

In certain aspects, the number of PUCCH resources to be reserved when mapping based on CCE index and slot index and/or K1 value is greater than the number of UEs 120 receiving the PDSCH DL grant on the PDCCH. Therefore, certain PUCCH resources may go unutilized. In particular, if the number of possible K1 values for the DL grant for a UE 120 is Z, and there are Y UEs 120 receiving DL grant, then there are Y*Z possible PUCCH resources the DL grant could map to for transmitting ACK to avoid collisions. However, only Y of such PUCCH resources may actually be utilized for ACK. Accordingly, in certain aspects, unused PUCCH resources may be reassigned to other UEs or even channels to carry other information (e.g., explicit PUCCH resource mapping, other signaling, other control information, other data, etc.).

In certain aspects, where the PUCCH resource is mapped based on CCE index and slot index and/or K1 value, if a single UE 120 uses different K1 values for different DL grants, they may be mapped to different PUCCH resources. However, it may be more efficient for the UE 120 to use the same PUCCH resource to transmit ACK for multiple DL grants. Accordingly, in certain aspects, if a single UE uses different K1 values for different DL grants, a single PUCCH resource is used to transmit the ACK. The PUCCH resource may correspond to one (e.g., the latest or earliest) of the multiple PUCCH resources mapped to by the different slot index and/or K1 value. In certain aspects, a single PUCCH resource of the multiple PUCCH resources is selected when the total number of bits for the ACK payload is less than or equal to 2 (e.g., 2 PDSCH to ACK). In certain aspects, if the total number of bits for the ACK payload is greater than 2, the PDCCH (e.g., as part of the DL grant, a new UL grant, etc.) may include explicit mapping/scheduling of one or more PUCCH resources for the UE 120 to use to transmit ACK.

In certain aspects, such as in NR, the PUCCH may be divided into multiple regions for the UL part, a long duration part and a short duration part. The long duration part may comprise some of the symbols (a greater number of symbols) of the PUCCH, and the short duration part may comprise some of the symbols (a lesser number of symbols) of the PUCCH. UEs 120 may transmit in either the long duration part or short duration part of the PUCCH. For UEs 120 with very good signal quality with the BS 110, they may be able to utilize the short duration part to communicate (e.g., an ACK) with the BS 110 as the ACK can be successfully communicated even over the shorter duration. However, for UEs 120 with poorer signal quality with the BS 110, they may only be able to utilize the long duration part to communicate (e.g., an ACK) with the BS 110 as the ACK may need to be coded across more bits or transmitted more times for successful communication. Therefore, UE 120 may utilize the long duration part or the short duration part depending on channel quality between UE 120 and BS 110.

Therefore, in certain aspects, the DL grant in the PDCCH further indicates to UE 120 whether to transmit an ACK in the short duration part or the long duration part of the PUCCH. In certain aspects, a portion of the PDCCH (e.g., certain CCE indexes) is reserved for long duration PUCCH scheduling and a portion of the PDCCH (e.g., certain CCE indexes) is reserved for short duration PUCCH scheduling. Accordingly, the UE 120 (and BS 110) determines whether to use a PUCCH resource in the long duration part or the short duration part to transmit ACK based on the CCE index and whether that index maps to the short duration part or long duration part.

Figure 11:
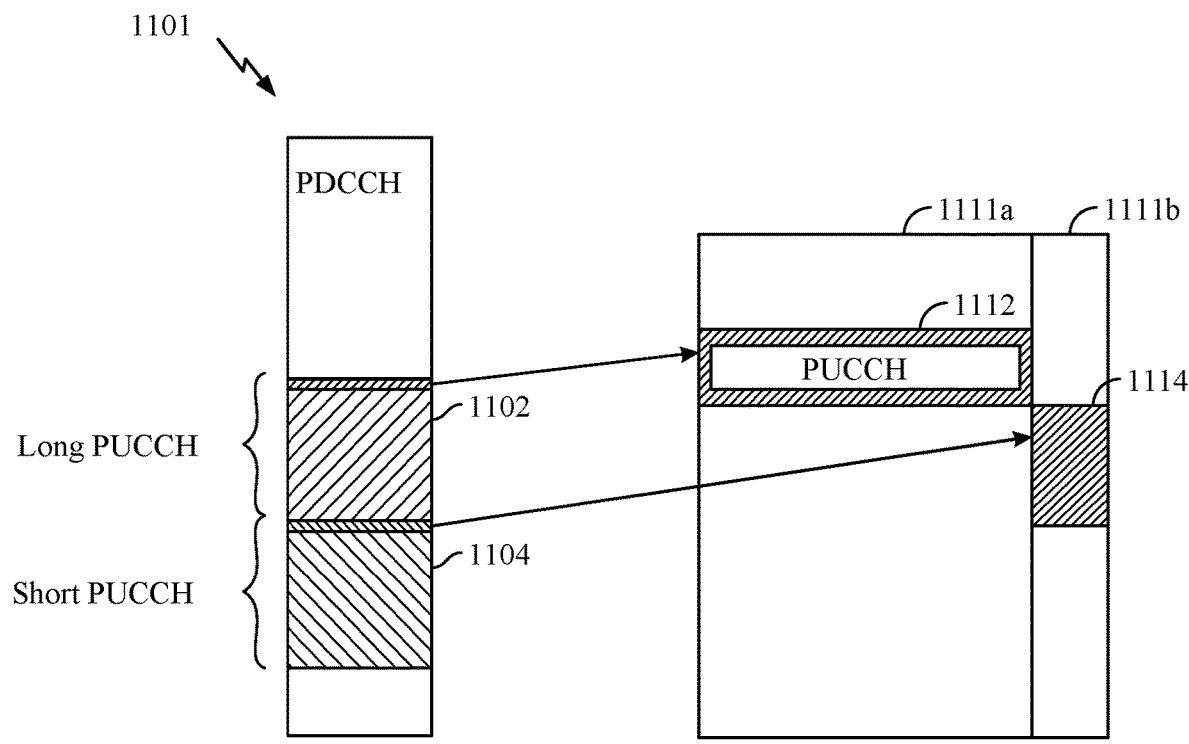

FIG. 11 illustrates an example mapping of PDCCH 1101 resources to PUCCH long duration 1111*a* and PUCCH short duration 1111*b* resources. As shown, PDCCH 1101 includes a first DL grant 1102 transmitted in one or more CCEs having a first starting CCE index that is reserved for mapping to PUCCH long duration 1111*a*. PDCCH 1101 includes a second DL grant 1104 transmitted in one or more CCEs having a second starting CCE index that is reserved for mapping to PUCCH short duration 1111*b*. As shown, based on the first starting CCE index associated with the first DL grant 1102, a first PUCCH resource 1112 in the PUCCH long duration 1111*a* is mapped. Based on the second starting CCE index associated with the second DL grant 1104, a second PUCCH resource 1114 in the PUCCH short duration 1111*b* is mapped.

In certain aspects, based on the example of FIG. 11A, if a BS 110 wants to schedule a UE 120 to transmit ACK in a particular part (PUCCH long duration 1111*a* or PUCCH short duration 1111*b*), BS 110 must transmit the DL grant to UE 120 in a CCE in the PDCCH associated with the part. This may increase a PDCCH blocking rate, meaning that the BS 110 can only schedule so many UEs 120 in a particular part dependent on how many CCEs are reserved for that part.

Accordingly, in certain aspects, CCEs may not be reserved for a particular part (PUCCH long duration 1111*a* or PUCCH short duration 1111*b*). Instead, the UE 120 may be separately configured to utilize one of the parts for ACK transmission and the CCE index may just indicate a PUCCH resource in the configured part. Therefore, any CCE index can map to either part. In certain aspects, whether a UE 120 should use the long duration part or the short duration part is indicated (e.g., using 1 bit) in RRC configuration, DCI, or some other signaling (e.g., as part of the DL grant). Accordingly, first DL grant 1102 for example, could map to either first PUCCH resource 1112 or second PUCCH resource 1114 based on the configuration of UE 120.

In certain aspects, the number of PUCCH resources to be reserved when mapping based on CCE index and an indication of which part of PUCCH to use is greater than the number of UEs 120 receiving the PDSCH DL grant on the PDCCH. Therefore, certain PUCCH resources may go unutilized. In particular, if there are Y UEs 120 receiving DL grant, and they can be mapped to either long or short part, then there are Y*2 possible PUCCH resources the DL grant could map to for transmitting ACK to avoid collisions. However, only Y of such PUCCH resources may actually be utilized for ACK. Accordingly, in certain aspects, unused PUCCH resources may be reassigned to other UEs or even channels to carry other information (e.g., explicit PUCCH resource mapping, other signaling, other control information, other data, etc.).

In certain aspects, a UE 120 may utilize slot aggregation. For example, a UE 120 with poor signal quality with BS 110 (e.g., at the cell edge) may need to utilize multiple slots to transmit an ACK (e.g., transmit multiple times) in order to successfully transmit the ACK to BS 110.

Figure 12:
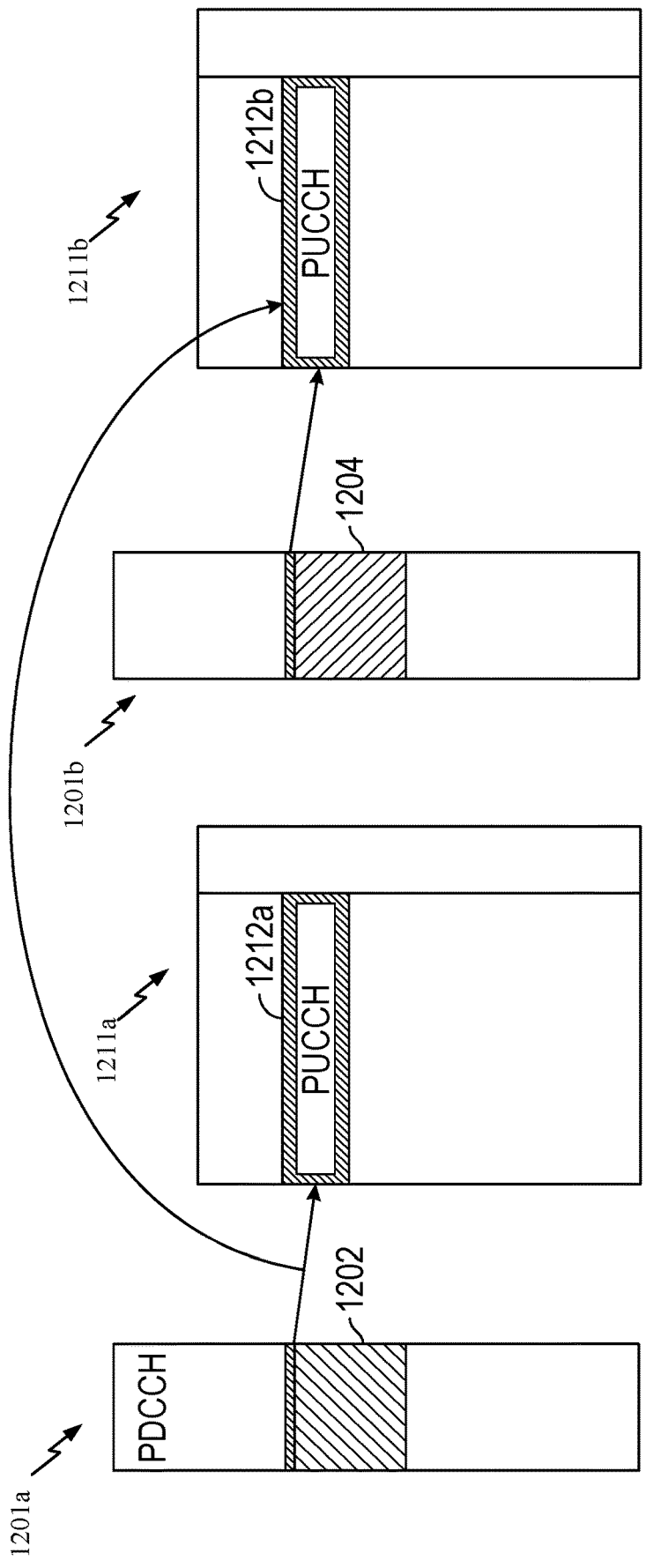

FIG. 12 illustrates an example mapping of PDCCH 1201*a* and 1201*b* resources to PUCCH 1211*a* and PUCCH 1211*b* resources. As shown, PDCCH 1201*a* is transmitted at a first DL time slot and includes a first DL grant 1202 transmitted in one or more CCEs having a first starting CCE index. PDCCH 1201*b* is transmitted at a second DL time slot and includes a second DL grant 1204 transmitted in one or more CCEs having the first starting CCE index. As shown, based on the first starting CCE index associated with the first DL grant 1202, a first PUCCH resource 1212*a* in PUCCH 1211*a* of a first UL time slot is mapped by the UE 120 to transmit ACK. Since UE 120 may have poor signal quality, it may further use slot aggregation and based on the first starting CCE index associated with the first DL grant 1202, also map a second PUCCH resource 1212*b* in PUCCH 1211*b* of a second UL time slot to transmit ACK. However, based on the first starting CCE index associated with the second DL grant 1204, another UE 120 may map the second PUCCH resource 1212*b* in PUCCH 1211*b* of the second UL time slot to transmit ACK. Therefore, there may be a collision.

Accordingly, in certain aspects, BS 110 may not utilize the same starting CCE index to transmit a DL grant for a second UE 120 in a second PDCCH slot (e.g., PDCCH 1201*b*) that is already used to transmit a DL grant for a first UE 120 in a first PDCCH slot (PDCCH 1201*a*) where the first UE 120 utilizes slot aggregation. The first and second PDCCH slots may be adjacent and ordered in time. For example, the BS 110 may assume a virtual PDCCH is present at the starting CCE index of the second PDCCH slot. Therefore, a different starting CCE index is utilized for the DL grant for the second UE 120 in the second PDCCH slot, which maps to a different PUCCH resource, thereby avoiding collision.

In certain aspects, avoiding certain CCE indexes in PDCCH for transmitting DL grant may increase a blocking rate for PDCCH, meaning those CCE resources cannot be used for transmitting DL grant, potentially underutilizing resources. Accordingly, in certain aspects, the CCE indexes not used may be used to carry other information and/or channels (e.g., UL grant for PUSCH and/or PUCCH, DL grant with explicit scheduling of ACK, etc.).

In certain aspects, any combination of the discussed mapping techniques may be used. In certain aspects, implicit mapping may only be used in some cases, and explicit scheduling of ACK may be used in other cases. For example, if only a single CORESET is used, there is not cross slot scheduling, only short duration or long duration is used for ACK, and/or only a single slot is used for transmission of ACK, then explicit scheduling may be used instead of implicit mapping.

FIG. 13 illustrates example operations that may be performed by a wireless device such as a node such as a base station (BS) (e.g., BS 110) or UE (e.g., UE 120) for mapping PDCCH resources to PUCCH resources for transmission of ACK, in accordance with aspects of the present disclosure.

Operations 1300 begin, at 1302, by determining a resource on a physical uplink control channel (PUCCH) to utilize for communicating an acknowledgement (ACK) for a data transmission on a physical downlink shared channel (PDSCH) based on a control channel element (CCE) index of a first CCE in a physical downlink control channel (PDCCH) that includes a downlink grant for the data transmission on the PDSCH and at least one of: a CORESET index of a CORESET in which the first CCE is included, a slot index of the PUCCH, a slot index of the PDSCH, an offset value between communication of the ACK and the PDSCH, or a mapping of CCE indexes to either a long or short region of the PUCCH.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a wireless device, the method comprising:
    determining a number of bits to utilize for communicating an acknowledgement (ACK) for a data transmission on a physical downlink shared channel (PDSCH);
    determining a resource on a physical uplink control channel (PUCCH) to utilize for communicating the ACK based on the number of bits, wherein:
        when the number of bits is less than or equal to two, the resource is determined based on an implicit mapping to a control channel element (CCE) index of a first CCE in a physical downlink control channel (PDCCH) that includes a downlink grant for the data transmission, and
        when the number of bits is greater than two, the resource is determined based on an explicit indicator of the resource; and
    communicating the ACK on the resource.

2. The method of claim 1, further comprising receiving the explicit indicator from a base station when the determined number of bits is greater than two.

3. The method of claim 2, wherein the explicit indicator is received on the PDCCH.

4. The method of claim 1, further comprising:
    transmitting the explicit indicator to a user equipment when the determined number of bits is greater than two.

5. The method of claim 4, wherein the explicit indicator is transmitted on the PDCCH.

6. The method of claim 1, wherein the wireless device is a user equipment, wherein communicating the ACK on the resource comprises transmitting the ACK on the resource, and further comprising:

receiving the downlink grant on the PDCCH; and
receiving the data transmission on the PDSCH based on the downlink grant.

7. The method of claim 1, wherein the wireless device is a base station, wherein communicating the ACK on the resource comprises receiving the ACK on the resource, and further comprising:
transmitting the downlink grant on the PDCCH; and
transmitting the data transmission on the PDSCH.

8. A wireless device comprising:
a memory; and
a processor coupled to the memory, the processor being configured to:
determine a number of bits to utilize for communicating an acknowledgement (ACK) for a data transmission on a physical downlink shared channel (PDSCH);
determine a resource on a physical uplink control channel (PUCCH) to utilize for communicating the ACK based on the number of bits, wherein:
when the number of bits is less than or equal to two, the resource is determined based on an implicit mapping to a control channel element (CCE) index of a first CCE in a physical downlink control channel (PDCCH) that includes a downlink grant for the data transmission, and
when the number of bits is greater than two, the resource is determined based on an explicit indicator of the resource; and
communicate the ACK on the resource.

9. The wireless device of claim 8, wherein the processor is further configured to receive the explicit indicator from a base station when the determined number of bits is greater than two.

10. The wireless device of claim 9, wherein the explicit indicator is received on the PDCCH.

11. The wireless device of claim 8, wherein the processor is further configured to:
transmit the explicit indicator to a user equipment when the determined number of bits is greater than two.

12. The wireless device of claim 11, wherein the explicit indicator is transmitted on the PDCCH.

13. The wireless device of claim 8, wherein the wireless device is a user equipment, wherein communicating the ACK on the resource comprises transmitting the ACK on the resource, and wherein the processor is further configured to:
receive the downlink grant on the PDCCH; and
receive the data transmission on the PDSCH based on the downlink grant.

14. The wireless device of claim 8, wherein the wireless device is a base station, wherein communicating the ACK on the resource comprises receiving the ACK on the resource, and wherein the processor is further configured to:
transmit the downlink grant on the PDCCH; and
transmit the data transmission on the PDSCH.

15. A wireless device comprising:
means for determining a number of bits to utilize for communicating an acknowledgement (ACK) for a data transmission on a physical downlink shared channel (PDSCH);
means for determining a resource on a physical uplink control channel (PUCCH) to utilize for communicating the ACK based on the number of bits, wherein:
when the number of bits is less than or equal to two, the resource is determined based on an implicit mapping to a control channel element (CCE) index of a first CCE in a physical downlink control channel (PDCCH) that includes a downlink grant for the data transmission, and
when the number of bits is greater than two, the resource is determined based on an explicit indicator of the resource; and
means for communicating the ACK on the resource.

16. The wireless device of claim 15, further comprising means for receiving the explicit indicator from a base station when the determined number of bits is greater than two.

17. The wireless device of claim 15, further comprising means for transmitting the explicit indicator to a user equipment when the determined number of bits is greater than two.

18. The wireless device of claim 15, wherein the wireless device is a user equipment, wherein means for communicating the ACK on the resource comprises means for transmitting the ACK on the resource, and further comprising:
means for receiving the downlink grant on the PDCCH; and
means for receiving the data transmission on the PDSCH based on the downlink grant.

19. The wireless device of claim 15, wherein the wireless device is a base station, wherein means for communicating the ACK on the resource comprises means for receiving the ACK on the resource, and further comprising:
means for transmitting the downlink grant on the PDCCH; and
means for transmitting the data transmission on the PDSCH.

20. A non-transitory computer readable storage medium that stores instructions that when executed by a wireless device cause the wireless device to perform a method for wireless communication, the method comprising:
determining a number of bits to utilize for communicating an acknowledgement (ACK) for a data transmission on a physical downlink shared channel (PDSCH);
determining a resource on a physical uplink control channel (PUCCH) to utilize for communicating the ACK based on the number of bits, wherein:
when the number of bits is less than or equal to two, the resource is determined based on an implicit mapping to a control channel element (CCE) index of a first CCE in a physical downlink control channel (PDCCH) that includes a downlink grant for the data transmission, and
when the number of bits is greater than two, the resource is determined based on an explicit indicator of the resource; and
communicating the ACK on the resource.

21. The non-transitory computer readable storage medium of claim 20, wherein the wireless device is a user equipment, wherein communicating the ACK on the resource comprises transmitting the ACK on the resource, and wherein the method further comprises:
receiving the downlink grant on the PDCCH; and
receiving the data transmission on the PDSCH based on the downlink grant.

22. The non-transitory computer readable storage medium of claim 20, wherein the wireless device is a base station, wherein communicating the ACK on the resource comprises receiving the ACK on the resource, and wherein the method further comprises:
transmitting the downlink grant on the PDCCH; and
transmitting the data transmission on the PDSCH.

* * * * *